United States Patent
Sallam

(10) Patent No.: US 9,147,071 B2
(45) Date of Patent: *Sep. 29, 2015

(54) SYSTEM AND METHOD FOR PROACTIVE DETECTION OF MALWARE DEVICE DRIVERS VIA KERNEL FORENSIC BEHAVIORAL MONITORING AND A BACK-END REPUTATION SYSTEM

(75) Inventor: Ahmed Said Sallam, Cupertino, CA (US)

(73) Assignee: McAfee, Inc., Santa Clara, CA (US)

( * ) Notice: Subject to any disclaimer, the term of this patent is extended or adjusted under 35 U.S.C. 154(b) by 350 days.

This patent is subject to a terminal disclaimer.

(21) Appl. No.: 12/840,032

(22) Filed: Jul. 20, 2010

(65) Prior Publication Data
US 2012/0023583 A1  Jan. 26, 2012

(51) Int. Cl.
G06F 11/00 (2006.01)
H04L 29/06 (2006.01)
G06F 21/56 (2013.01)

(52) U.S. Cl.
CPC ...... *G06F 21/564* (2013.01); *G06F 2221/2115* (2013.01)

(58) Field of Classification Search
USPC .......... 726/22, 23, 24, 25; 713/164, 182, 187, 713/188, 193; 709/203
See application file for complete search history.

(56) References Cited

U.S. PATENT DOCUMENTS

| | | | |
|---|---|---|---|
| 5,440,723 A | 8/1995 | Arnold et al. | 395/181 |
| 5,826,013 A | 10/1998 | Nachenberg | 395/186 |
| 6,973,578 B1 | 12/2005 | McIchionc | 713/200 |
| 6,986,042 B2 * | 1/2006 | Griffin | 713/164 |
| 7,069,589 B2 | 6/2006 | Schmall et al. | 726/24 |
| 7,137,039 B2 * | 11/2006 | Durrant et al. | 714/47.2 |
| 7,530,106 B1 * | 5/2009 | Zaitsev et al. | 726/24 |
| 7,571,482 B2 * | 8/2009 | Polyakov et al. | 726/24 |
| 7,725,941 B1 * | 5/2010 | Pavlyushchik | 726/24 |
| 7,730,040 B2 * | 6/2010 | Reasor et al. | 707/690 |
| 7,765,481 B2 | 7/2010 | Dixon et al. | 715/738 |
| 7,788,359 B2 | 8/2010 | Lund et al. | 709/223 |
| 7,890,627 B1 | 2/2011 | Thomas | 709/224 |
| 8,001,606 B1 | 8/2011 | Spertus | 726/25 |
| 8,112,806 B1 * | 2/2012 | Sobel et al. | 726/24 |

(Continued)

FOREIGN PATENT DOCUMENTS

GB    2466922    7/2010    ............. H04L 29/06

OTHER PUBLICATIONS

Secure Computing Corporation. "TrustedSource: The Next-Generation Reputation System for Enterprise Gateway Security". Published: 2007, pp. 1-17.*

(Continued)

*Primary Examiner* — Dede Zecher
*Assistant Examiner* — Abdullah Almamun
(74) *Attorney, Agent, or Firm* — Baker Botts L.L.P.

(57) ABSTRACT

A method for detecting malware device drivers includes the steps of identifying one or more device drivers loaded on an electronic device, analyzing the device drivers to determine suspicious device drivers, accessing information about the suspicious device drivers in a reputation system, and evaluating whether the suspicious device driver include malware. The suspicious device drivers are not recognized as not including malware. The reputation system is configured to store information about suspicious device drivers. The evaluation is based upon historical data regarding the suspicious device driver.

37 Claims, 4 Drawing Sheets

(56) References Cited

U.S. PATENT DOCUMENTS

| | | | |
|---|---|---|---|
| 8,499,349 B1* | 7/2013 | Cruz et al. | 726/24 |
| 8,572,371 B2* | 10/2013 | Gassoway | 713/165 |
| 2002/0066024 A1 | 5/2002 | Schmall et al. | 713/200 |
| 2003/0009482 A1 | 1/2003 | Benerjee et al. | 707/200 |
| 2003/0159070 A1* | 8/2003 | Mayer et al. | 713/201 |
| 2004/0187023 A1* | 9/2004 | Alagna et al. | 713/200 |
| 2006/0031483 A1 | 2/2006 | Lund et al. | 709/224 |
| 2006/0101277 A1 | 5/2006 | Meenan et al. | 713/182 |
| 2006/0130141 A1 | 6/2006 | Kramer et al. | 726/23 |
| 2006/0137012 A1 | 6/2006 | Aaron | 726/24 |
| 2006/0206713 A1 | 9/2006 | Hickman et al. | 713/176 |
| 2007/0006308 A1 | 1/2007 | Desouza et al. | 726/24 |
| 2007/0130351 A1 | 6/2007 | Alperovitch et al. | 709/229 |
| 2007/0162587 A1 | 7/2007 | Lund et al. | 709/223 |
| 2007/0214151 A1 | 9/2007 | Thomas et al. | 707/10 |
| 2007/0250927 A1* | 10/2007 | Naik et al. | 726/22 |
| 2008/0016339 A1 | 1/2008 | Shukla | 713/164 |
| 2008/0082662 A1 | 4/2008 | Dandliker et al. | 709/225 |
| 2008/0133540 A1 | 6/2008 | Hubbard et al. | 707/10 |
| 2008/0178288 A1 | 7/2008 | Alperovitch et al. | 726/22 |
| 2008/0189788 A1 | 8/2008 | Bahl | 726/25 |
| 2008/0244744 A1 | 10/2008 | Thomas et al. | 726/24 |
| 2008/0244748 A1 | 10/2008 | Neystadt et al. | 726/25 |
| 2009/0044276 A1 | 2/2009 | Abdel-Aziz et al. | 726/24 |
| 2009/0070878 A1* | 3/2009 | Wang et al. | 726/24 |
| 2009/0077664 A1 | 3/2009 | Hsu et al. | 726/24 |
| 2009/0083852 A1 | 3/2009 | Kuo et al. | 726/22 |
| 2009/0165137 A1* | 6/2009 | Yoo et al. | 726/24 |
| 2009/0187991 A1* | 7/2009 | Freericks et al. | 726/24 |
| 2009/0282476 A1* | 11/2009 | Nachenberg et al. | 726/22 |
| 2010/0058468 A1 | 3/2010 | Green et al. | 726/22 |
| 2010/0077480 A1* | 3/2010 | Yoo | 726/24 |
| 2010/0192222 A1 | 7/2010 | Stokes et al. | 726/22 |
| 2011/0107423 A1 | 5/2011 | Kolar Sunder et al. | 726/24 |
| 2011/0209219 A1* | 8/2011 | Zeitlin et al. | 726/23 |
| 2011/0209222 A1* | 8/2011 | Sharp et al. | 726/26 |

OTHER PUBLICATIONS

United States Patent Application; U.S. Appl. No. 12/694,960; pp. 36, Jan. 27, 2010.

Unites States Office Action; U.S. Appl. No. 12/694,960; pp. 19, Mar. 5, 2012.

United States Patent Application; U.S. Appl. No. 12/694,988; pp. 38, Jan. 27, 2010.

Unites States Office Action; U.S. Appl. No. 12/694,988; pp. 25, Apr. 18, 2012.

United States Patent Application; U.S. Appl. No. 12/695,005; pp. 56, Jan. 27, 2010.

Unites States Office Action; U.S. Appl. No. 12/695,005; pp. 37, Apr. 19, 2012.

United States Patent Application; U.S. Appl. No. 12/695,011; pp. 42, Jan. 27, 2010.

Unites States Office Action; U.S. Appl. No. 12/695,011; pp. 25, Mar. 7, 2012.

United States Patent Application; U.S. Appl. No. 12/874,700; pp. 25, Sep. 2, 2010.

* cited by examiner

SYSTEM AND METHOD FOR PROACTIVE DETECTION OF MALWARE DEVICE DRIVERS VIA KERNEL FORENSIC BEHAVIORAL MONITORING AND A BACK-END REPUTATION SYSTEM

TECHNICAL FIELD OF THE INVENTION

The present invention relates generally to computer security and malware protection and, more particularly, to a system and method and system for proactive detection of malware device drivers via kernel modification and a back-end reputation system.

BACKGROUND

Kernel mode malware is very hard to detect and to repair. When a device driver is loaded, an anti-virus engine or other anti-malware software may not have enough information about the device driver to decide whether it is malicious or not. After a device driver is loaded, it is almost impossible to repair the device driver malware without requiring a system reboot. In addition, a device driver malware can attack the anti-virus engine and disable its functionality.

Malware may include the varieties described above. Malware may also include, but is not limited to, spyware, rootkits, password stealers, spam, sources of phishing attacks, sources of denial-of-service-attacks, viruses, loggers, Trojans, adware, or any other digital content that produces unwanted activity.

SUMMARY

A method for detecting malware device drivers includes the steps of identifying one or more device drivers loaded on an electronic device, analyzing the device drivers to determine suspicious device drivers, accessing information about the suspicious device drivers in a reputation system, and evaluating whether the suspicious device driver include malware. The suspicious device drivers are not recognized as not including malware. The reputation system is configured to store information about suspicious device drivers. The evaluation is based upon historical data regarding the suspicious device driver.

In a further embodiment, an article of manufacture includes a computer readable medium and computer-executable instructions. The computer-executable instructions are carried on the computer readable medium. The instructions are readable by a processor. The instructions, when read and executed, cause the processor to identify one or more device drivers loaded on an electronic device, analyze the device drivers to determine suspicious device drivers, access information about the suspicious device drivers in a reputation system, and evaluate whether the suspicious device drivers are malware device drivers. The suspicious device drivers is not recognized as not including malware. The reputation system is configured to store information about suspicious device drivers. The evaluation is based upon historical data regarding the suspicious device drivers.

In yet another embodiment, a system for detecting malware device drivers includes a monitor and a reputation system. The monitor is configured to identify one or more device drivers loaded on an electronic device, analyze the device drivers to determine suspicious device drivers, and send information about the suspicious device driver to a reputation system. The suspicious device drivers are not recognized as not including malware. The reputation system is configured to access information about the suspicious device driver in a reputation database, and evaluate whether the suspicious device driver is a malware device driver. The reputation database is configured to store information about suspicious device drivers. The evaluation is based upon historical data regarding the suspicious device driver. The monitor and reputation system are communicatively coupled.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
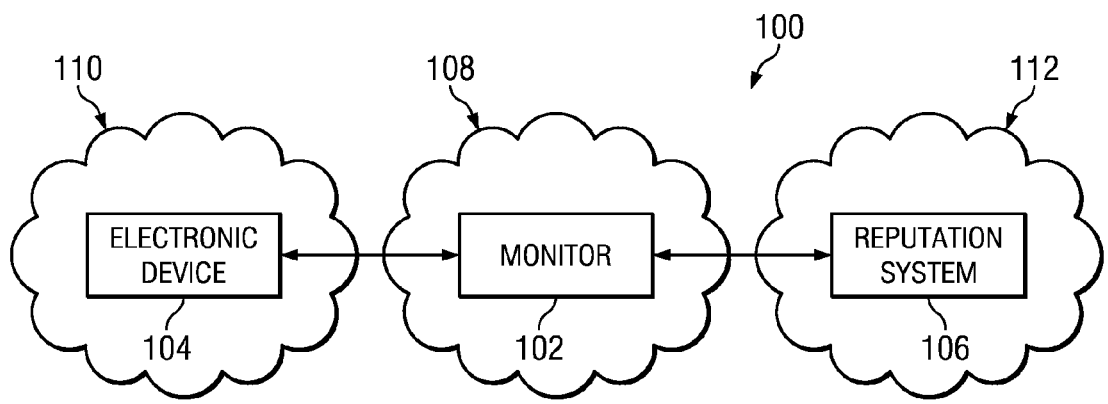
FIG. 1 is an illustration of an example system for detecting malware device drivers.

FIG. 1 is an illustration of an example system 100 for detecting malware device drivers. System 100 may comprise a monitor 102, an electronic device 104, and a reputation server 106. Monitor 102 may be configured to scan electronic device 104 for suspicious device drivers. Monitor 102 may be configured to communicate with reputation server 106 to determine whether the suspicious device drivers comprise a malware infection. Reputation server 106 may be configured to evaluate the suspicious device drivers, generate a repair, identify a signature for the device drivers, and monitor 102 may be configured to receive and enact the evaluation, repair, and signature from reputation server 106.

In one embodiment, monitor 102 may be configured to operate in a cloud computing scheme. Monitor 102 may comprise software that resides on network 108, and may be loaded and executed on a machine in network 108. Monitor may be communicatively coupled to electronic device 104 through network 108 or any other suitable network or communication scheme. Monitor may scan electronic device 104 without executing on electronic device 104. Monitor 102 may be communicatively coupled to reputation server 106 through network 108, network 112, or both. The reputation server 106 may comprise a server on network 112. In one embodiment, monitor 102 and reputation server 106 may reside on the same network. In one embodiment, monitor 102 and reputation server 106 may reside on the same hardware.

In one embodiment, monitor 102 may reside on electronic device 104. Monitor 102 may be loaded and executed on electronic device 104. Monitor 102 may be communicatively coupled to reputation server 106 through network 112, or any other suitable network or communication scheme.

Networks 108, 110, 112 may comprise any suitable networks for communication between electronic device 104, monitor 102, and reputation server 106. Such networks may include but are not limited to: the Internet, an intranet, wide-area-networks, local-area-networks, back-haul-networks, peer-to-peer-networks, or any combination thereof.

Electronic device 104 may comprise any device configurable to interpret and/or execute program instructions and/or process data, including but not limited to: a computer, desktop, server, laptop, personal data assistant, or smartphone.

Figure 2:
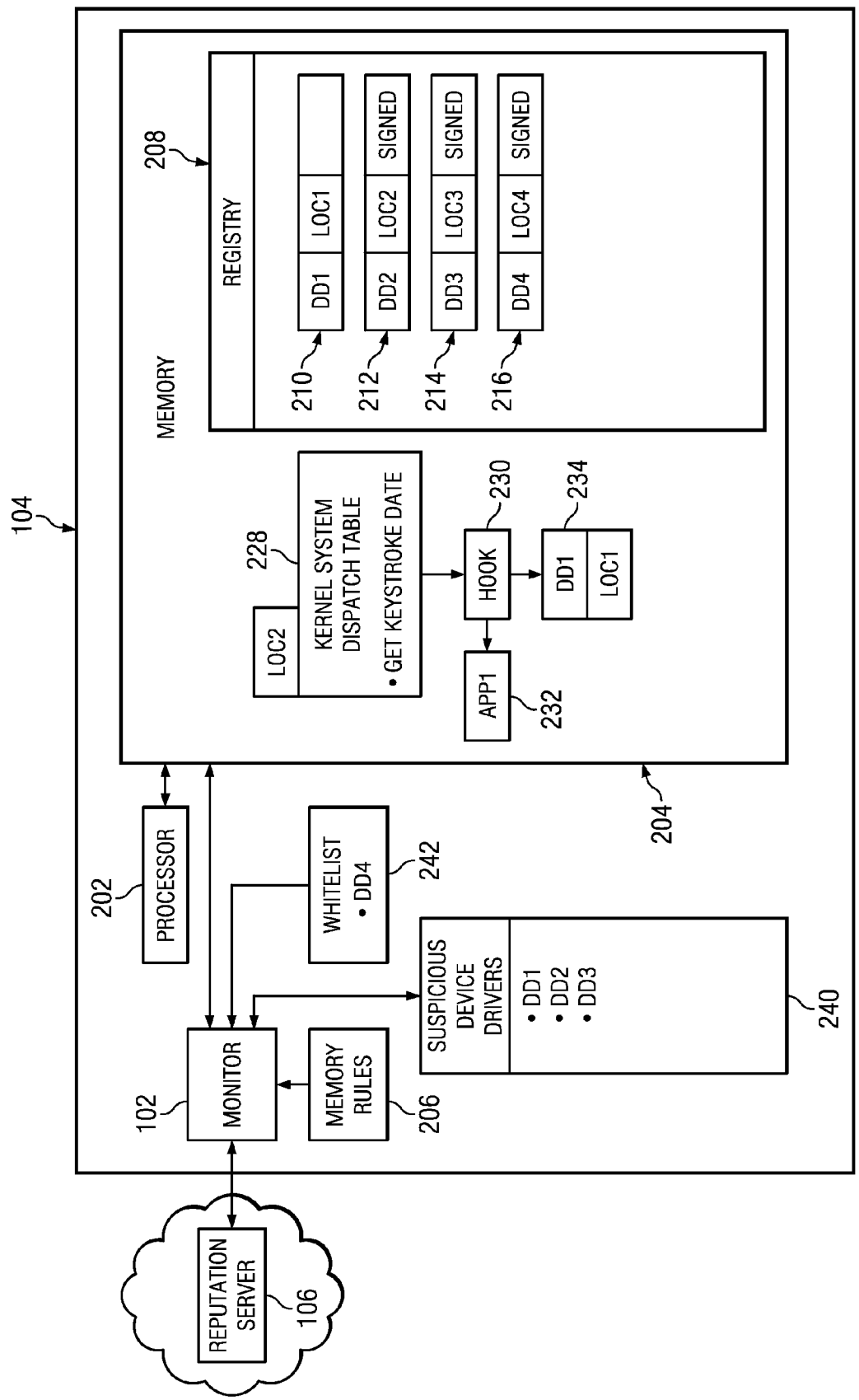
FIG. 2 is an illustration in further detail of some portions of the system that scan an electronic device for suspicious device drivers.

FIG. 2 is an illustration in further detail of some portions of the system 100 that may be configured to scan an electronic device 104 for suspicious device drivers. Monitor 102 may be configured to scan memory 204 to compile suspicious device drivers 240 that may comprise memory modifications made by malware, and report suspicious device drivers 240 to reputation server 106. Electronic device 104 may comprise a processor 202 coupled to a memory 204. Monitor 102 may reside on electronic device 104, or on any other electronic device, server, or other suitable mechanism to scan electronic device 104 for suspicious device drivers. Monitor 102 may comprise any application, process, script, module, executable, server, executable object, library, or other suitable digital entity. Monitor 102 may be communicatively coupled to reputation server 106 over network 112. Monitor 102 may be configured to reside in memory 204 for execution by processor 202 with instructions contained in memory 204.

Processor 202 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 202 may interpret and/or execute program instructions and/or process data stored in memory 204. Memory 204 may be configured in part or whole as application memory, system memory, or both. Memory 204 may include any system, device, or apparatus configured to hold and/or house one or more memory modules. Each memory module may include any system, device or apparatus configured to retain program instructions and/or data for a period of time (e.g., computer-readable media).

Monitor 102 may be configured to run on electronic device 104. Monitor may be implemented in an application, process, shared library, executable, module, script, function, or any other suitable technique for carrying out the functions described in the present disclosure.

Monitor 102 may be configured to utilize memory rules 206 to determine whether device drivers in memory 204 are suspicious. Memory rules 206 may comprise any technique for monitor 102 to determine that a suspicious device driver is in memory 204. Memory rules 206 may be implemented by any suitable technique for indicating to monitor 102 suitable rules for scanning a memory for suspicious device drivers, including but not limited to: logic, instructions, a shared library, application, function, module, database, table, list, or other data structure or executable. In one embodiment, monitor 102 may comprise some functions, data, or configurations of memory rules 206. Memory rules 206 may be configured to be a dynamic set of memory rules. In one embodiment, memory rules 206 may be configured to be updated by monitor 102, by reputation server 106, or by a combination of both.

Memory rules 206 may comprise a list of data, data spaces and/or other data entities in memory 204 that are known to be modified by malware device drivers. Memory rules 206 may also comprise data values for such places and/or entities that indicate safe or, conversely, unsafe values. Memory rules 206 may also comprise a logical rule for interpreting the data found at the data space. For example, where a pointer points to in memory may be modified by a malware device driver. A kernel system dispatch table may contain an entry with a pointer for a function that points to an application in memory. In one embodiment, memory rules 206 may comprise indications that such a pointer should point to known locations. Memory rules 206 may comprise a list of known device drivers that are safe and do not comprise malware. If the monitor 102 determines that the pointer points to an unknown entity, the pointer may comprise a suspicious memory modification associated with a device driver. If the monitor 102 determines that the pointer points to a memory location not recognized as normally pointed to by the kernel system dispatch, table, the pointer may indicate that the function is associated with a suspicious device driver.

Memory rules 206 may comprise a rule that a device driver found in memory 204 that is not on whitelist 242 may be a suspicious device driver. Whitelist 242 may comprise a list of device drivers that are known to be safe, and are thus not suspicious. Whitelist 242 may be populated, updated, and maintained by monitor 102, reputation server 106, or any other suitable entity. Whitelist 242 may be implemented with hashes, signatures, or any other suitable mechanism for uniquely identifying a given device driver.

Memory rules 206 may comprise a rule that a device driver found in memory 204 that is not signed by the creator of the device driver may be a suspicious device driver. A signature may uniquely identify the creator of the device driver.

Monitor 102 may be configured to scan memory 204 for device drivers that are suspicious because they may comprise malware, based on memory rules 206. Monitor 102 may scan any portion of memory 204 known to be modified by malware. Monitor 102 may scan the registry 208 for registered device drivers.

In one embodiment, monitor 102 may be configured to examine a kernel system dispatch table in memory 204 for indications of modifications by suspicious device drivers. Kernel system dispatch table 228 may comprise a list of functions registered by various system executables of electronic device 104. For example, "get keystroke data" may be a function used to capture keystroke data. Based on known values in memory rules 206, monitor 102 may be configured to determine whether a memory hook 230 is intercepting page fault interrupts. Memory hook 230 may be detected based on, for example, a change in the pointers of the dispatch table entry. Memory rules 206 may indicate that the function should instead point to a given location, such as the application APP1 232. The presence of memory hook 230 may not be known to be safe, according to memory rules 206, and thus monitor 102 may be configured to determine that memory hook 230 is suspicious. Memory hook 230 may instead be configured to redirect the information to a device driver such as DD1 234, occupying a memory location loc1. Monitor 102 may be configured to examine the location to which memory hook 230 is redirecting information, and identify the controlling device driver as a suspicious device driver. Monitor 102 may be configured to examine the registry 208 to determine whether an entry for a given device driver, such as DD1 210 is associated with a suspicious change in memory.

Monitor 102 may be configured to examine all loaded code sections in the kernel mode of electronic device 104 in order to identify any originating device driver. If monitor 102 cannot identify the originating device driver of a given code section, then monitor 103 may deem the code section as suspicious. Such a code section may include a potential kernel mode code injection attack. Monitor 102 may be configured to examine such code directly to determine whether the code includes indication of malware. In one embodiment, monitor 102 may be configured to determine whether a memory hook originates from the code section. In such an embodiment, monitor 102 may be configured to only determine that the code section is suspicious after finding such an indication of malware. Monitor 102 may be configured to gather information related to the code section for use by a reputation server.

Monitor 102 may be configured to scan memory 204 for the presence of device drivers through any suitable method. In one embodiment, monitor 102 may scan registry 208 for registered device drivers. In another embodiment, monitor 102 may be configured to use a cloud aware anti-virus signature rule file, such as Artemis Aware MicroC driver, to read and write to kernel memory, and to enumerate loaded drivers using a shell operating system application. In yet another embodiment, monitor 102 may be configured to use the function NtQuerySystemInformation to scan memory. However, NtQuerySystemInformation may not be reliable to discover a rootkit device driver.

For each device driver found, monitor 102 may be configured to determine whether a found device driver is on whitelist 242. If a device driver is not identified in whitelist 242, monitor 102 may be configured to determine that the device driver is suspicious. For example, whitelist 242 may indicate that a device driver DD4 216 does not comprise malware, but may contain nothing about another device driver DD2 212. If monitor 102 has determined that DD2 212 is not on whitelist 242, then monitor 102 may be configured to determine that DD2 212 is a suspicious device driver.

For each device driver found, monitor 102 may also be configured to determine whether the device driver is signed by its creator or not. If the device driver is not signed, then the device driver may be a suspicious device driver. For example, monitor 102 may discover that a device driver DD3 214 is not signed. Monitor 102 may be configured to determine that DD3 214 is a suspicious device driver. In one embodiment, a device driver that is digitally signed by its creator may be excluded from suspicion. Monitor 102 may be configured to evaluate all loaded drivers to determine whether the drivers are signed. Monitor 102 may be configured to determine whether the device driver is signed if an operating system of electronic device 104 requires all device drivers to be signed. In one embodiment, monitor 102 may be configured to evaluate individual code sections of device drivers, if an operating system of electronic device 104 requires each code section to be signed. In such an embodiment, monitor 102 may gather information on each code section for reporting.

Monitor 102 may be configured to collect additional information about a given device driver. In one embodiment, monitor 102 may be configured to determine the load order of the device driver, including whether it is a boot type, service order type, manually loadable, or dynamically loadable driver. In another embodiment, monitor 102 may be configured to collect registration information of an input/output filter device driver, or intercept device driver dispatch routines. In yet another embodiment, monitor 102 may be configured to connect to input/output interrupts to sniff input/output commands and data.

Monitor 102 may be configured to summarize the suspicious device drivers in a table 240 of suspicious device drivers. Table 240 of suspicious device drivers may be implemented by a table, list, database, file, or any other suitable data structure for storing information concerning the suspicious device drivers determined by monitor 102. Table 240 of suspicious device drivers may be configured to store identifying information concerning a given suspicious device driver, including but not limited to: the device driver's location, any memory modified by the device driver, the value of the memory modified by the device driver, a signature or hash of the device driver, information about the functions affected by the device driver, the load order of the device driver, and any other relevant information.

Monitor 102 may be configured to communicate with reputation server 106 to determine whether suspicious device drivers in electronic device 104 comprise malware device driver. In one embodiment, monitor 102 may be configured to transmit table 240 of suspicious device drivers to reputation server 106. Monitor 102 may be configured to receive an indication of whether the device drivers comprise malware from reputation server 106. Reputation server 106 may be configured to determine whether a given device driver comprises malware or not.

Monitor 102 may be configured to protect electronic device 104 based on information that one or more suspicious device drivers that are known to comprise malware. Monitor 102 may be configured to protect electronic device 104 in any means suitable to repair a malware device driver. Monitor 102 may be configured to protect electronic device 104 by repairing the memory affected by the device driver to a known safe state. In one embodiment, monitor 102 may be configured to receive instructions for repairing memory 204 from reputation server 106. In another embodiment, monitor 102 may be configured to apply a repair driver received from reputation server 106, or from another suitable source upon instruction from reputation server 106. In yet another embodiment, monitor 102 may be configured to start verifying the device driver as the driver loads in memory and evaluate a device driver image on disk looking for any suspicious vectors, such as a importing sensitive kernel functions, employing self-modifying code, or employing anti-reverse engineering techniques. Monitor 102, or a suitable repair driver, may be configured to repair double or quad word memory areas by using a locked memory exchange operation. Monitor 102 or a suitable repair driver may also be configured to use any appropriate technique for repairing memory 204 of malware device driver effects. In one embodiment, monitor 102 may be configured to use the Codean library, used by the utility known as Rootkit Detective, to examine user mode code sections, as well as the import and export sections of shared libraries. In another embodiment, monitor 102 may be configured to use a feature of the McAfee Anti-Virus system known as common shell, allowing monitor 102 to read and write to kernel memory. In such an embodiment, monitor 102 may be configured to call the common shell directly. Monitor 102 may be configured to unregister the device driver from the registry, or otherwise remove the device driver from operation. Monitor 102 may be configured to update an anti-virus engine with a signature of the malware device driver.

Monitor 102 may be configured to conduct a scan of electronic device at any suitable time for detecting suspicious device drivers. In one embodiment, monitor 102 may be configured to conduct such a scan and subsequent repair as part of seeking a particular rootkit. In another embodiment, monitor 102 may be configured to conduct such a scan and subsequent repair during normal analysis of drivers. In yet another embodiment, monitor 102 may be configured to conduct such a scan and subsequent repair as part of the analysis for a new malware object. Monitor 102 may be configured to optimize its scanning for these embodiments such that a full scan does not occur upon the creation of every new file. For example, the monitor 102 may be configured to scan a single new process when that new process is launched. In another example, monitor 102 may be configured to scan kernel memory when a new driver is launched.

Figure 3:
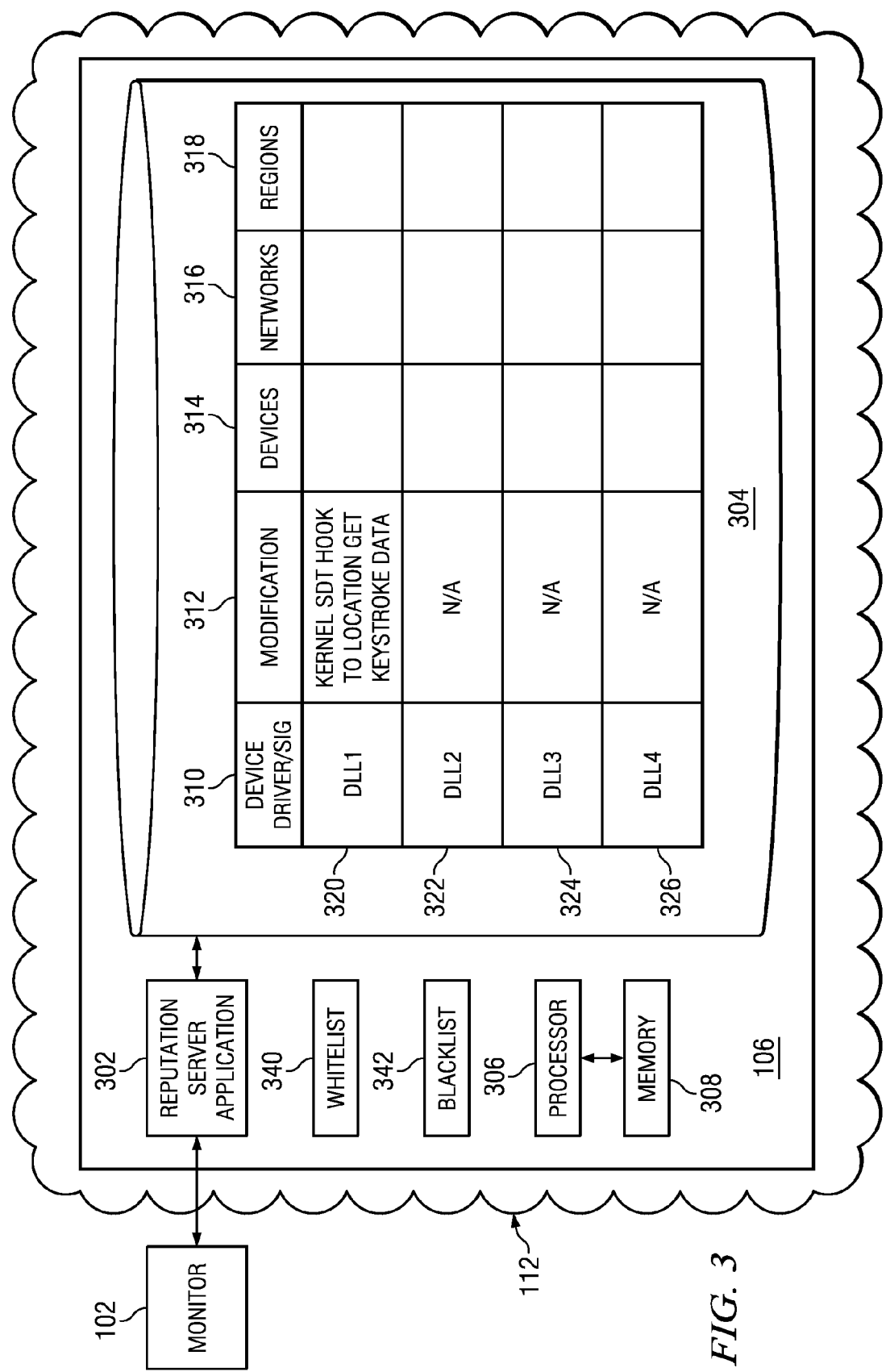
FIG. 3 is an illustration of an example reputation server for tracking device drivers according to the device drivers' propensity to comprise malware.

FIG. 3 is an illustration of an example reputation server 106 for tracking device drivers according to the device drivers' propensity to comprise malware. Reputation server 106 may comprise a reputation server application 302, a reputation database 304, and a processor 306 coupled to a memory 308. Reputation server application 302 may be configured to communicate with monitor 102 and reputation database 304 to track device drivers to determine whether the device drivers comprise malware.

Reputation server application 302 may comprise any application, process, script, module, executable, server, executable object, library, or other digital entity suitable to interface monitor 102 and reputation database 304 to track the reputation of device drivers according to the device drivers' propensity to host malware. Reputation server application 302 may reside on reputation server 106, or on any other suitable server to track the reputation of device drivers according to the device drivers' propensity to comprise a malware device driver. Reputation server application 302 may be communicatively coupled to monitor 102. In one embodiment, reputation server application 302 may be communicatively coupled to monitor 102 over network 112. Reputation server application 302 may communicatively coupled to reputation database 304. In one embodiment, application 302 may be communicatively coupled to reputation database 102 over network 114. In one embodiment, reputation server application 302 and monitor 102 may be co-located within the same device, application, server, or process. In one embodiment, reputation server application 302 and monitor 102 may comprise functions, modules, libraries, or portions of the same application, server, or process. In such an application, some features or functions of reputation server application 302 and monitor 102 may be redundant, and thus combined. Reputation server application 302 may be configured to perform particular functions or configurations of monitor 102, and vice-versa, where possible. In one embodiment, monitor 102 may be configured to reside on reputation server 106, in memory 308 for execution by processor 306 with instructions contained in memory 308.

Processor 306 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 306 may interpret and/or execute program instructions and/or process data stored in memory 308. Memory 308 may be configured in part or whole as application memory, system memory, or both. Memory 308 may include any system, device, or apparatus configured to hold and/or house one or more memory modules. Each memory module may include any system, device or apparatus configured to retain program instructions and/or data for a period of time (e.g., computer-readable media).

Reputation server application 302 may be configured to receive information from monitor 102 concerning one or more suspicious device drivers present on electronic device 104. Information from monitor 102 concerning suspicious device drivers on electronic device 104 may comprise the identities of one or more device drivers. Reputation server application 302 may be configured to access data contained within reputation database 304 to determine whether or not each of the suspicious device drivers comprises a malware infection. In one embodiment, reputation server application 302 may receive a specific indication from reputation database 304 that a particular device driver comprises malware. In a further embodiment, reputation server application 302 may receive information from reputation database 304 about a particular device driver's propensity to comprise malware, which reputation server application 302 must use to determine whether to indicate to monitor 102 that the particular device driver is safe, known to comprise malware, or is unknown whether it is safe or comprises malware.

Reputation server application 302 may be configured to indicate to monitor 102 whether one or more particular device drivers are known to comprise a malware device driver.

Reputation server application 302 may be configured to populate information in reputation database 304 based upon information received from monitor 102. Reputation server application 302 may be configured to populate reputation database 304 with information associated with a particular device driver, such as that in table 240 of suspicious device drivers. Reputation server application 302 may also be configured to populate reputation database 304 with information concerning the electronic device 104 for which the information is reported, as well as the network 110 on which electronic device 104 resides. Reputation server application 302 may be configured to determine, based upon the network 110 or upon other information, the region or other general geographic location of electronic device 104. For example, electronic device 104 may reside on a network 110 that reputation server application may determine is located in France, or generally in Western Europe.

If no entry for a given device driver exists in reputation database 304, reputation server application 302 may be configured to create an entry for the given device driver in reputation database 304. Reputation server application 302 may be configured to give a new entry in reputation database 304 default values. Reputation server application may be configured to associate a new entry in reputation database 304 with an existing entry.

Reputation database 304 may comprise information associating one or more device drivers and the device drivers' propensity to be associated with malware. Reputation database 304 may be configured to be accessible to provide such information. In one embodiment, reputation database may be configured to be accessible by use of database queries from reputation server application 302. Reputation database 304 may reside on reputation server 106. Reputation database 304 may reside in memory 308, or another such memory. Reputation database 304 may be configured in any manner suitable for providing information associating one or more device drivers and the device drivers' propensity to comprise a malware infection. Reputation database 304 may be implemented in a database, file, record, module, library, or any other suitable mechanism. Reputation database 304 may contain any number of entries 320-326 for various device drivers. Reputation database 304 may comprise one or more categorizations, classifications and/or evaluations of particular device drivers in regards to the device drivers' association with malware. In one embodiment, each entry in reputation database 304 may comprise a device driver field 310, a modification field 312, a known infected devices field 314, a known infected networks field 316, and/or a known infected regions field 318. In other embodiments, each entry in reputation database may comprise additional fields suitable to identify, classify, or evaluate a device driver.

Device driver field 310 may be configured to indicate the device driver for which data is stored in reputation database 304. Device driver field 310 may comprise any suitable information by which a device driver may be stored, sorted, queried, and/or identified. In one embodiment, device driver field 310 may comprise a digital signature of the device driver. In other embodiments, device driver field 310 may comprise a hash or other unique identifier for identifying a device driver.

Modification field 312 may comprise information about a kernel memory modification associated with a device driver, including but not limited to: a modified memory location, modified memory value, information about the code section pointed to by a pointer, and/or information about module pointed to by a pointer.

Known infected devices field 314 may comprise information about the quantity and/or identity of devices for which a given device driver has been reported. In one embodiment, known infected devices field 314 may comprise information about the source application that is associated with the given device driver on electronic device 104. Known infected devices field 314 may be implemented in any suitable manner for indicating the quantity or identity of such devices. In one embodiment, known infected devices field 314 may be implemented by a record of all devices for which a given device driver has been reported. In another embodiment, known infected devices field 314 may be implemented by an indication of the number of different devices for which a given device driver has been reported. Known infected devices field 314 may also contain an indication of the time in which the device driver was reported.

Similarly, known infected networks field 316 may comprise information about the quantity and/or identity of networks for which a given device driver has been reported. In one embodiment, known infected networks field 316 may be configured to derive information from the known infected devices field 314, indicating networks upon which such devices reside. Known infected networks field 316 may comprise information arising from a particular network node, a domain, subdomain, or any combination thereof. In one embodiment, known infected networks field 316 may use internet protocol ("IP") addresses and/or host names. For example, a device with the IP address "255.255.255.255" and the host name "example1.example2.com" may have been reported as having a given device driver. In a reputation database 304 entry for the given device driver, the known infected network field 316 may comprise information about the device driver according to "255.255.255.255," "255.255.255.*", and/or "255.255.*" wherein "*" indicates all the nodes of a given subnet mask. Similarly, known infected network field 316 may comprise information about the device driver according to "example1.example2.com", and/or "*.example2.com." Known infected networks field 316 may be implemented in any suitable manner for indicating the quantity or identity of such devices. In one embodiment, known infected networks field 316 may be implemented by a record of all networks for which a given device driver has been reported. In another embodiment, known infected networks field 316 may be implemented by an indication of the number of different networks for which a given device driver has been reported. Known infected networks field 316 may also contain an indication of the time in which the device driver was reported.

Similarly, known infected regions field 318 may comprise information about the quantity and/or identity of geographical regions for which a given device driver has been reported. In one embodiment, known infected regions field 318 may be configured to derive information from the known infected devices field 314 and/or known infected networks field 316, indicating the geographical regions for which a given device driver has been reported. For example, a device with a particular IP address may have reported a device driver. The country of origin of the device (France, for example) may be determined from IP address and stored in known infected regions field 318. In another example, a region broader than nation of origin may be stored in known infected regions field 318, such as "Western Europe." In one embodiment, known infected regions field 318 may be implemented by a record of all networks for which a given device driver has been reported. In another embodiment, known infected regions field 318 may be implemented by an indication of the number of different networks for which a given device driver has been reported. Known infected regions field 318 may also contain an indication of the time in which the device driver was reported.

Reputation server application 302 may be configured to query reputation database 304 to receive information about a particular device driver. The information about a particular device driver may comprise a distribution pattern of the device driver. Reputation database 304 may be configured to return information for a particular device driver that was queried. Reputation server application 302 may use any suitable criteria to determine whether a device driver comprises a malware infection or not.

Reputation database 304 may be configured to return an indication that the device driver comprises a malware infection. In one embodiment, the indication may be derived from the presence of the device driver in a blacklist 342. Blacklist 342 may comprise a list of device drivers known to host malware. In one embodiment, blacklist 342 may be implemented by an indication in a field of reputation database 304.

Reputation database 304 may be configured to return an indication that the device driver does not comprise a malware infection. In one embodiment, the indication may be derived from the presence of the device driver in a whitelist 340. Whitelist 340 may comprise a list of device drivers known to be safe. In one embodiment, whitelist 340 may be implemented by an indication in a field of reputation database 304.

In one embodiment, whitelist 340 and/or blacklist 342 may be implemented by a data structure to list device drivers whose status as malware has been previously determined. Reputation server application 302 may be configured to examine whitelist 340 or blacklist 342 directly to obtain information whether or not a given device driver comprises a malware infection.

If a device driver is not specifically indicated in reputation database 304, whitelist 340, and/or blacklist 342 as either safe or malware, then reputation server application 302 may be configured to determine the malware status of the device driver from other information in reputation database 304. Reputation server application 302 may be configured to then populate the reputation database 304 with information about a given device driver, such as described above or in table 240 of suspicious device drivers. Reputation server application 302 may be configured to utilize any suitable criteria to determine whether information from reputation database 304 shows that an undetermined device driver comprises a malware infection or not.

To determine whether a device driver comprises a malware infection or not, reputation server application 302 may be configured to take into account the distribution pattern of the device driver. In one embodiment, the distribution pattern of a device driver may be determined from information such as those in known infected devices field 314, known infected networks field 316, and/or known infected regions field 318.

In one embodiment, reputation server application 302 may be configured to analyze information such as fields 314-318 to find that a device driver has been reported on thousands of devices on thousands of domains in a short amount of time. In such an embodiment, reputation server application 302 may be configured to determine that the device driver does not comprise a malware infection. Similarly, reputation server application 302 may be configured that a device driver reported on thousands of devices on many different geographical regions (for example, North America, Western Europe, and east Asia) does not comprise a malware infection. Any suitable threshold of installations in a given time frame or on a given number of domains may be selected, corresponding to a distribution pattern of a safe device driver. In one embodiment, a distribution pattern of a thousand devices in a seventy-two-hour window may comprise a safe distribution pattern.

In one embodiment, reputation server application 302 may be configured analyze information such as fields 314-318 to find that a particular device driver has been installed on different devices from the same domain. In such an embodiment, reputation server application 302 may be configured to determine that the device driver does not comprise malware. Any suitable threshold of installations in a given time frame or on a given number of domains may be selected, corresponding to a distribution pattern of a safe device driver. In one embodiment, any number of installations within a single subdomain may comprise a safe distribution pattern.

In one embodiment, reputation server application 302 may be configured to analyze information such as fields 314-318 to find that a particular device driver has been encountered a relatively few number of times on different devices, but on a wide number of different domains, or groups of internet addresses, over a relatively long period of time. In such an embodiment, reputation server application 302 may be configured to determine that such a device driver comprises malware. Any suitable threshold of instances in a given time frame or on a given number of domains may be selected, corresponding to a distribution pattern of a device driver comprising malware. In one embodiment, five different instances of the device drivers from five different domains, in more than one region may comprise a malware infection.

If reputation server application 302 determines that a given device driver comprises a malware infection, reputation server application 302 may be configured to create, designate, or assemble a repair driver to send to monitor 102 for repairing the memory of electronic device 104. Reputation server application 302 may be configured to create, designate, or assemble any suitable repair driver for repairing electronic device 102. The repair driver may comprise a script, executable, shared library, or other executable function. Monitor 102 may be configured to apply the repair driver to electronic device 104. In one embodiment, reputation server application 302 may be configured to send an update to an anti-virus engine protecting electronic device 104 with an indication of the signature of a newly discovered malware device driver. Reputation server application 302 may be configured to send any suitable indication, instruction, or information to monitor 102 to notify 102 that a given device driver comprises malware, or conversely, that a given device driver does not comprise malware. In the event that it is determined that a given device driver does or does not comprise malware, reputation server application 302 may be configured to update reputation database 304 with the evaluation.

Reputation server application 302 may be configured to act upon a request from electronic device 104. Reputation server application 302 may be configured to act pro-actively push data to electronic device 104.

In operation, in FIGS. 1-3 a monitor 102 may be operating to scan electronic device 104 for suspicious device drivers that may comprise malware. Monitor 102 may communicate with reputation server 106 to determine whether device drivers present on electronic device 104 comprise malware. Reputation server 106 may evaluate the suspicious device drivers, generate a repair, and monitor 102 may receive and enact the evaluation and repair from reputation server 106.

Monitor 102 may be running on a cloud computing scheme. Monitor 102 may be operating on a machine in network 108. Monitor 102 may be operating on electronic device 104. Monitor 104 may be operating on a machine in network 110. Reputation server 106 may be running on a machine in network 110. Reputation server 106 and monitor 104 may be running on the same machine.

Monitor 102 may scan memory 204 to determine what device drivers are present on electronic device 104. Monitor 102 may utilize memory rules 206 to determine whether device drivers on electronic device 104 are suspicious. In one embodiment, memory rules 206 may be updated by monitor 102, by reputation server 106, or by a combination of both. Monitor 102 may apply any memory rule 206 suitable to identify a suspicious device driver. Monitor 102 may compile a table 240 of suspicious device drivers, and report table 240 of suspicious device drivers 240 to reputation servers 106.

In one embodiment, monitor 102 may examine a kernel system dispatch table for memory modifications conducted by device drivers, and identify unrecognized changes as suspicious. In another embodiment, monitor 102 may identify unsigned device drivers as suspicious. In yet another embodiment, monitor 102 may identify device drivers not known to be safe by their presence in whitelist 242 as suspicious.

Monitor 102 may conduct a scan of electronic device at any suitable time for detecting suspicious device drivers. Monitor 102 may optimize scanning such that a full scan does not occur upon the creation of every new file. For example, monitor 102 may scan kernel memory when a new driver is launched.

Monitor 102 may summarize the suspicious device drivers in a table 240 of suspicious device drivers. Monitor 102 may communicate with reputation server 106 to determine whether suspicious device drivers in electronic device 104 comprise malware infections. In one embodiment, monitor 102 may transmit table 240 of suspicious device drivers to reputation server 106. Monitor 102 may receive an indication of whether the device drivers comprise malware from reputation server 106. Reputation server 106 may determine whether a given device driver comprises a malware infection or not.

Reputation server application 302 may communicate with monitor 102 and reputation database 304 to track device drivers to determine whether the device drivers comprise malware. Reputation server application 302 may perform particular functions or configurations of monitor 102, and vice-versa, where possible. In one embodiment, monitor 102 may be running on reputation server 106, in memory 308 for execution by processor 306 with instructions contained in memory 308.

Reputation server application 302 may receive information from monitor 102 concerning one or more suspicious device drivers present on electronic device 104. Reputation server application 302 may access data contained within reputation database 304 to determine whether or not the suspicious device driver comprises a malware infection. In one embodiment, reputation server application 302 may receive a specific indication from reputation database 304 that a particular device driver comprises a malware infection. In one embodiment, reputation server application 302 may receive information from reputation database 304 about a particular device driver's propensity to comprise a malware infection, which reputation server application 302 must use to determine whether to indicate to monitor 102 that the particular device driver is safe, or known to comprise malware. Reputation server application 302 may indicate to monitor 102 whether one or more particular device drivers comprise malware.

Reputation server application 302 may populate information in reputation database 304 based upon information received from monitor 102. Reputation server application 302 may populate reputation database 304 with information associated with a particular device driver, such as that in table 240 of suspicious device drivers. Reputation server application 302 may also populate reputation database 304 with information concerning the electronic device 104 for which the information is reported, network 110 on which electronic device 104 resides, and/or the region or other general geographic location of electronic device 104.

If no entry for a given device driver exists in reputation database 304, reputation server application 302 may create an entry for the given device driver in reputation database 304.

Reputation server application 302 may access information for a given device driver. In one embodiment, reputation server application 302 may query reputation database 304 to receive information about a particular device driver. Reputation database 304 may return information for a particular device driver that was queried. Reputation server application 302 may use any suitable criteria to determine whether a device driver comprises a malware infection or not, based on the results returned from reputation database 304.

In one embodiment, reputation database 304 may return an indication that the device driver comprises a malware infection. In another embodiment, reputation database 304 may return an indication that the device driver does not comprise a malware infection.

To determine whether a device driver comprises a malware infection or not, reputation server application 302 may take into account the information in known infected devices field 314, known infected networks field 316, and/or known infected regions field 318. In one embodiment, reputation server application 302 may examine a distribution pattern of the device driver as represented in fields 314-318.

In one embodiment, reputation server application 302 may analyze information such as fields 314-318 to find that a particular device driver has been reported on thousands of devices on thousands of domains in a short amount of time, and thus not comprise a malware infection. In another embodiment, reputation server application 302 may be configured analyze information such as fields 314-318 to find that a particular device driver has been installed on different devices from the same domain, and thus not comprise malware. In yet another embodiment, reputation server application 302 may analyze information such as fields 314-318 to find that a particular device driver has been encountered a relatively few number of times on different devices, but on a wide number of different domains, or groups of internet addresses, and thus comprise malware.

If reputation server application 302 determines that a given device driver comprises a malware infection, reputation server application 302 may send a repair driver to monitor 102 for repairing the memory of electronic device 104, and/or an indication to monitor 102 that the given device driver comprises a malware infection. Reputation server application 302 may update reputation database 304, whitelist 340, and/or blacklist 342 with the evaluation.

Monitor 102 may protect electronic device 104 based on information that one or more suspicious device drivers comprises malware infections. Monitor 102 may protect electronic device 104 by repairing the memory affected by the suspicious device driver to a known safe state, adding a signature of the device driver to an anti-virus engine, or applying a repair driver.

Figure 4:
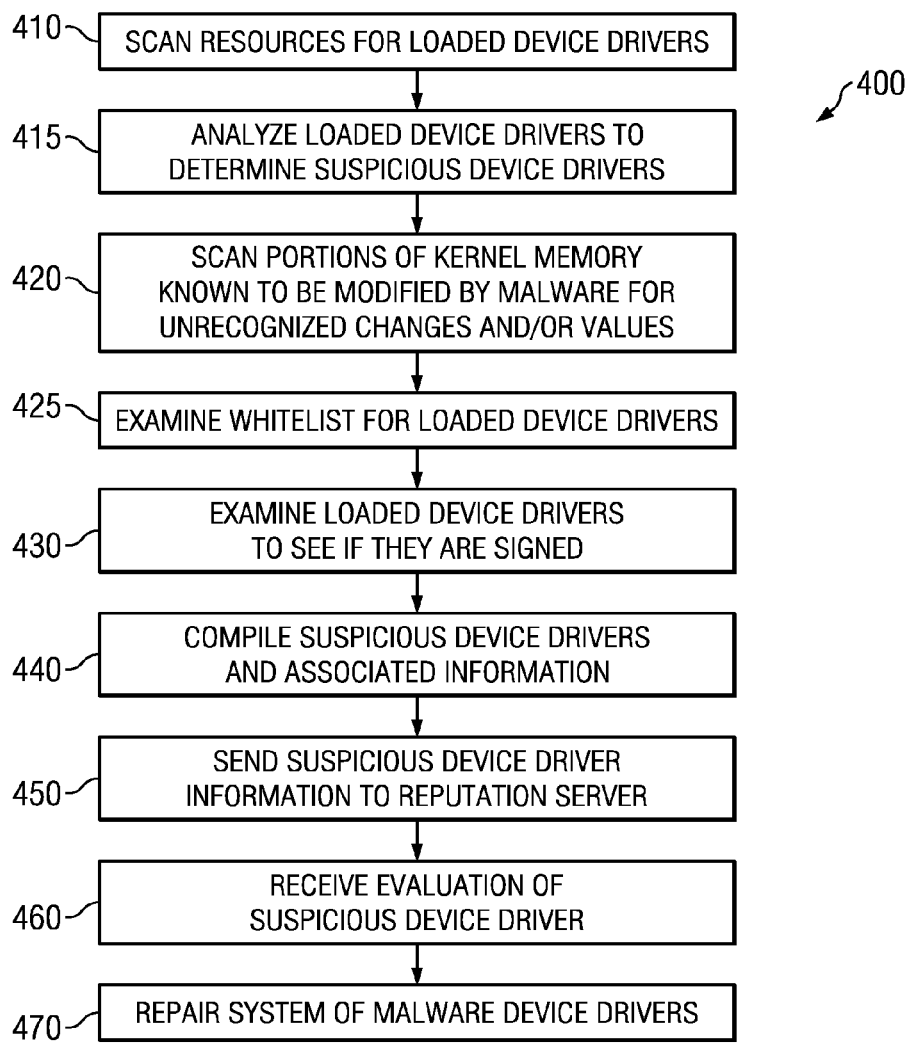
FIG. 4 is an illustration of example method to detect and repair suspicious device drivers on an electronic device.

FIG. 4 is an illustration of example method 400 to detect and repair suspicious device drivers on an electronic device. In step 410, the resources of an electronic device may be scanned for loaded device drivers present on the system. In one embodiment, the registry of the electronic device is scanned for device drivers. In step 415, the found device drivers are analyzed to determine whether they are suspected of comprising malware or not. Step 415 may be implemented by the use of a memory rule. Step 415 may comprise the steps 420-430.

In step 420, portions of kernel memory of an electronic device known to be modified by malware may be scanned for unrecognized changes and/or values. In a further embodiment, step 415 may comprise the step of scanning kernel system dispatch table entries for memory hooks. A device driver connected to such an unrecognized change and/or value may comprise a suspicious device driver.

In step 425, loaded device drivers not appearing in a whitelist may be deemed to be suspicious.

In step 430, device drivers that have not been signed by their creator may be deemed as suspicious.

In step 440, the suspicious device drivers on the electronic device may be compiled. In one embodiment, an identifying signature of the device driver, any memory modifications associated with the device driver, the identity of the electronic device, its network and region may be noted with information concerning the suspicious device drivers may be compiled.

In step 450, the suspicious device driver information may be sent to a server for an evaluation of whether the device drivers comprise a malware infection. In step 460, the evaluations of the suspicious device drivers may be received. Some suspicious device drivers may have been determined to not comprise a malware infection. Such device drivers may be left undisturbed on the electronic device. Some suspicious device drivers may have been determined to comprise a malware infection. In step 470, such device drivers may be repaired. In one embodiment, a repair driver received from the reputation sever may be employed to fix the malware infection in the memory of the electronic device. In another embodiment, an anti-virus software engine may be updated with the newly identified malware device driver.

Figure 5:
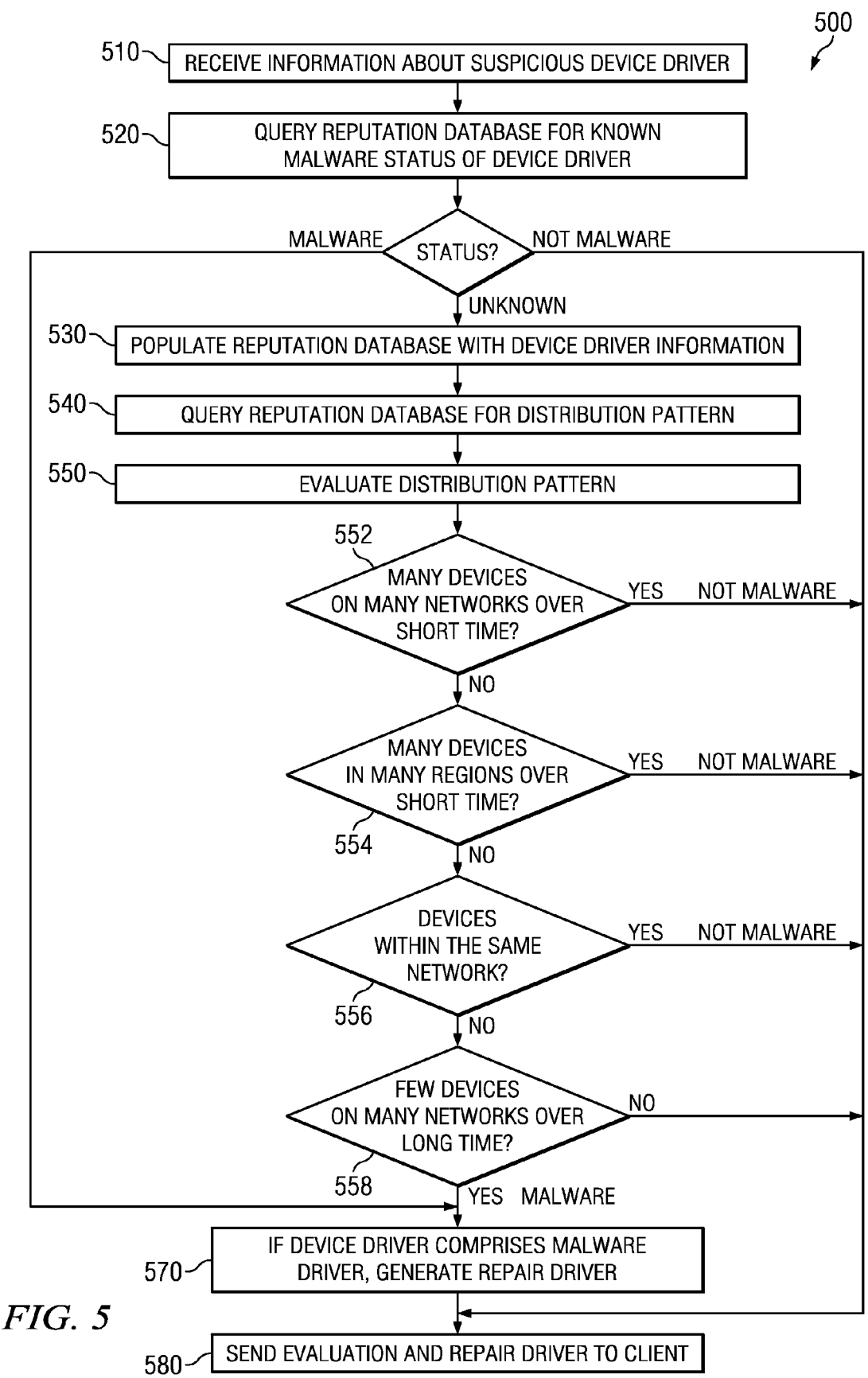
FIG. 5 is an illustration of example method to evaluate suspicious device drivers as to whether they comprise a malware infection.

FIG. 5 is an illustration of example method 500 to evaluate suspicious device drivers as to whether they comprise a malware infection. In step 510, information about a suspicious device driver may be received. The information may include identifying information about the device driver, memory modifications associated with the device driver, as well as information about the device, network, and/or region where it was found.

In step 520, a reputation database may be queried to determine if the malware status of the device driver is known. In one embodiment, step 520 may be implemented by examining a whitelist and/or a blacklist. If the device driver is known to not comprise malware, step 580 may be executed next. If the device driver is known to comprise a malware infection, step 570 may be executed next. If the device driver is unknown (neither known to be safe or comprise malware), then the status of the device driver may be determined in step 530.

In step 530, the reputation database may be populated with information received about the device driver. In step 540, the reputation database may be queried for the distribution pattern of the device driver. The distribution pattern may include information about the number and timing of device drivers reported on different devices, networks, and/or regions.

In step 550, the distribution pattern may be evaluated to determine whether or not the device driver comprises a malware infection. Steps 552-558 illustrate example embodiments of steps to evaluate the distribution pattern. In step 552, if the device driver has appeared on a relatively high number of devices, on a relatively high number of networks, in a relatively short period of time, the device driver may be determined to not comprise a malware infection. In step 554, if the device driver has appeared on a relatively high number of devices, in a relatively high number of regions, in a relatively short period of time, the device driver may be determined to not comprise a malware infection. In step 556, if the device driver has appeared on devices all within the same network, sub-network, domain or subdomain, then the device driver may be determined to not comprise a malware infection. In step 558, if the device driver has appeared on a relatively few number of devices on a relatively high number of different networks and/or regions, over a relatively long period of time, then the device driver may be determined to comprise a malware infection. If no pattern is sufficiently recognized to determine that a device driver does or does not comprise a malware infection, then the status of the device driver may be undetermined. The reputation database will continue to track such device drivers as the method 500 is repeated when the device driver is next encountered, until such time when a pattern may be used to establish the nature of the device driver. The status of the device driver may be stored in the reputation database. In one embodiment, a newly determined status of a device driver may be stored in a whitelist or a blacklist.

In step 570, if a device driver has been determined to comprise a malware infection, then a repair driver may be generated. In step 580, the evaluation of the device driver, as well as any repair drivers or instructions may be sent to a client for further use on the electronic device.

Methods 400 and 500 may be implemented using the system of FIGS. 1-3, or any other system operable to implement methods 400 and 500. As such, the preferred initialization point for methods 400 and 500 and the order of the steps comprising methods 400 and 500 may depend on the implementation chosen. In some embodiments, some steps may be optionally omitted, repeated, or combined. In some embodiments, some steps of method 400 may be accomplished in method 500, and vice-versa. In some embodiments, methods 400 and 500 may be combined. In certain embodiments, methods 400 and 500 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A method for detecting malware device drivers, comprising:
    identifying one or more device drivers loaded on an electronic device;
    analyzing the device drivers to determine suspicious device drivers, the suspicious device drivers unrecognized as safe, comprising:
        selectively scanning specified portions of kernel memory, the specified portions known to be modified by malware device drivers;
        comparing the specified portions of kernel memory against known values; and
        associating the specified portions of kernel memory with a candidate device driver; and
    identifying the suspicious device drivers based upon at least:
        a load order, the load order including whether a given device driver is a boot type, service order type, manually loadable, or dynamically loadable driver;
        a determination that the specified portions of kernel memory associated with the candidate device driver are unrecognized;
        a determination that the candidate device driver is unsigned;
    based on the determination of the suspicious device drivers, accessing information about the suspicious device drivers from a reputation system, the reputation system configured to store information about suspicious device drivers; and
    based on the determination of the suspicious device drivers, evaluating whether the suspicious device drivers comprise malware device drivers, wherein the evaluation is based upon historical data regarding the suspicious device driver.

2. The method of claim 1, wherein analyzing the device drivers to determine suspicious device drivers comprises:
    examining a whitelist for a device driver; and
    determining whether the device driver is suspicious based at least on a determination that the device driver is not in the whitelist.

3. The method of claim 1, further comprising cleaning the electronic device of a malware device driver, wherein the evaluation is that the suspicious device driver is a malware device driver.

4. The method of claim 3, wherein cleaning the electronic device of a malware device driver comprises repairing the memory of the electronic device.

5. The method of claim 1, further comprising generating a repair driver for the electronic device, wherein the evaluation is that the suspicious device driver is a malware device driver.

6. The method of claim 1, further comprising sending information concerning unrecognized memory values associated with the suspicious device driver to the reputation system.

7. The method of claim 1, further comprising sending information identifying the electronic device to the reputation system.

8. The method of claim 1:
    wherein analyzing the device drivers to determine suspicious device drivers comprises:
        examining a loaded code section within a kernel mode to identify an originating device driver, the originating device driver associated with the loaded code section; and
        determining whether the originating device driver is suspicious based at least on a determination that the originating device driver is undetermined;
    further comprising:
        determining whether the loaded code section comprises a memory hook; and
        sending information regarding the loaded code section and the memory hook to the reputation server based on a determination that the loaded code section comprises a memory hook.

9. The method of claim 1, wherein:
the electronic device comprises an operating system kernel, the operating system kernel requiring device drivers to be digitally signed; and
analyzing the device drivers to determine suspicious device drivers comprises determining whether the device drivers are digitally signed.

10. The method of claim 9, wherein:
the operating system requires each code section of device drivers to be digitally signed; and
analyzing the device drivers to determine suspicious device drivers comprises analyzing a hash of each code section.

11. The method of claim 1, wherein evaluating whether the suspicious device driver is a malware device driver comprises comparing the distribution pattern of the suspicious device driver against a known distribution pattern, the known distribution pattern indicating a safe device driver or a malware device driver.

12. An article of manufacture, comprising:
a computer readable non-transitory medium; and
computer-executable instructions carried on the computer readable non-transitory medium, the instructions readable by a processor, the instructions, when read and executed, for causing the processor to:
identify one or more device drivers loaded on an electronic device;
analyze the device drivers to determine suspicious device drivers, the suspicious device drivers unrecognized as safe, comprising:
selectively scanning specified portions of kernel memory, the specified portions known to be modified by malware device drivers;
comparing the specified portions of kernel memory against known values; and
associating the specified portions of kernel memory with a candidate device driver; and
determining that the candidate device driver is suspicious based at least on:
a load order, the load order including whether a given device driver is a boot type, service order type, manually loadable, or dynamically loadable driver;
a determination that specified portions of kernel memory associated with the candidate device driver are unrecognized; and
a determination that the candidate device driver is unsigned;
based on the determination of the suspicious device drivers, access information about the suspicious device drivers from a reputation system, the reputation system configured to store information about suspicious device drivers; and
based on the determination of the suspicious device drivers, evaluate whether the suspicious device drivers comprise malware device drivers, wherein the evaluation is based upon historical data regarding the suspicious device drivers.

13. The article of claim 12 wherein causing the processor to analyze the device drivers to determine suspicious device drivers comprises causing the processor to:
examine a whitelist for a device driver; and
determining whether the device driver is suspicious based at least on a determination that the device driver is excluded from the whitelist.

14. The article of claim 12, wherein the processor is further caused to clean the electronic device of a malware device driver, wherein the evaluation is that the suspicious device driver is a malware device driver.

15. The article of claim 12, wherein causing the processor to clean electronic device of a malware device driver comprises causing the processor to repair the memory of the electronic device.

16. The article of claim 12, wherein the processor is further caused to generate a repair driver for the electronic device, wherein the evaluation is that the suspicious device driver is a malware device driver.

17. The article of claim 12, wherein the processor is further caused to send information concerning unrecognized memory values associated with the suspicious device driver to the reputation system.

18. The article of claim 17, wherein the processor is further caused to send information identifying the electronic device to the reputation system.

19. The article of claim 12, wherein evaluating whether the suspicious device driver is a malware device driver comprises comparing the distribution pattern of the suspicious device driver against a known distribution pattern, the known distribution pattern indicating a safe device driver or a malware device driver.

20. A system for detecting malware device drivers, comprising:
a processor;
a computer readable medium coupled to the processor; and
computer-executable instructions carried on the computer readable medium, the instructions readable by the processor, the instructions, when read and executed, for causing the processor to:
identify one or more device drivers loaded on an electronic device;
analyze the device drivers to determine suspicious device drivers, the suspicious device drivers unrecognized as safe, comprising:
determining that a candidate device driver is suspicious based at least on:
a determination that the candidate device driver is unsigned; and
a load order, the load order including whether a given device driver is a boot type, service order type, manually loadable, or dynamically loadable driver; and
selectively scanning specified portions of kernel memory, the specified portions known to be modified by malware device drivers;
comparing the specified portions of kernel memory against known values;
associating the specified portions of kernel memory with the candidate device driver; and
a determination that the specified portions of kernel memory associated with the candidate device driver are unrecognized;
based on the determination of the suspicious device drivers, send information about the suspicious device driver to a reputation system;
access information about the suspicious device driver from the reputation system, the reputation system configured to store information about suspicious device drivers; and
based on the determination of the suspicious device drivers, evaluate whether the suspicious device driver is a malware device driver, wherein the evaluation is based upon historical data regarding the suspicious device driver.

21. The system of claim 20, wherein configuring the processor to analyze the device drivers to determine suspicious device drivers comprises further configuring the processor to:
examine a whitelist for a device driver; and
determining whether the device driver is suspicious based at least on a determination that the device driver is excluded from the whitelist.

22. The system of claim 20, wherein configuring the processor to analyze the device drivers to determine suspicious device drivers comprises further configuring the processor to examine a device driver to determine whether the device driver is signed.

23. The system of claim 20, wherein the processor is further configured to clean the electronic device of a malware device driver, wherein the evaluation is that the suspicious device driver is a malware device driver.

24. The system of claim 20, wherein configuring the processor to clean electronic device of a malware device driver comprises configuring the monitor to repair the memory of the electronic device.

25. The system of claim 20, wherein the processor is further configured to generate a repair driver for the electronic device, wherein the evaluation is that the suspicious device driver is a malware device driver.

26. The system of claim 20, wherein the processor is further configured to send information concerning unrecognized memory values associated with the suspicious device driver to the reputation system.

27. The system of claim 26, wherein the processor is further configured to send information identifying the electronic device to the reputation system.

28. The system of claim 20, wherein evaluating whether the suspicious device driver is a malware device driver comprises comparing the distribution pattern of the suspicious device driver against a known distribution pattern, the known distribution pattern indicating a safe device driver or a malware device driver.

29. A method for detecting malware device drivers, comprising:
obtaining information about one or more device drivers loaded on an electronic device, the one or more device drivers determined to be suspicious device drivers;
accessing information about the suspicious device drivers from a reputation system, the reputation system configured to store information about suspicious device drivers; and
evaluating whether the suspicious device drivers comprise malware device drivers, including:
comparing a determined quantity of devices for which the suspicious device driver has been reported against a first upper threshold;
comparing the time range of the determined quantity of devices against a first lower threshold; and
determining that the suspicious device driver is not a malware device driver based at least on a determination that the determined quantity of devices exceeds the first upper threshold and the time range of the determined quantity of devices is less than the first lower threshold.

30. The method of claim 29, wherein evaluating whether the suspicious device driver is a malware device driver further comprises:
determining a range of networks from which the suspicious device driver has been reported; and
based at least on a determination that the suspicious device driver has been reported from a single network, determining that the suspicious device driver is not a malware infection.

31. The method of claim 29, wherein evaluating whether the suspicious device driver is a malware device driver further comprises:
comparing the determined quantity of devices for which the suspicious device driver has been reported against a second lower threshold;
comparing the time range of the determined quantity of devices against a second upper threshold; and
determining that the suspicious device driver is a malware device driver based at least on a determination that the determined quantity of devices is less than the second lower threshold and the time range of the determined quantity of devices exceeds the second upper threshold.

32. An article of manufacture, comprising:
a non-transitory computer readable medium; and
computer-executable instructions carried on the computer readable medium, the instructions readable by a processor, the instructions, when read and executed, for causing the processor to:
obtain information about one or more device drivers loaded on an electronic device, the one or more device drivers determined to be suspicious device drivers;
access information about the suspicious device drivers from a reputation system, the reputation system configured to store information about suspicious device drivers; and
evaluate whether the suspicious device drivers comprise malware device drivers, comprising causing the processor to:
compare the distribution pattern of the suspicious device driver against a known distribution pattern, the known distribution pattern indicating a safe device driver or a malware device driver;
compare a determined quantity of devices for which the suspicious device driver has been reported against a first upper threshold;
compare the time range of the determined quantity of devices against a first lower threshold; and
determine that the suspicious device driver is not a malware device driver based at least on a determination that the determined quantity of devices exceeds the first upper threshold and the time range of the determined quantity of devices is less than the first lower threshold.

33. The article of claim 32, wherein causing the processor to evaluate whether the suspicious device driver is a malware device driver further comprises causing the processor to:
determine a range of networks from which the suspicious device driver has been reported; and
based at least on a determination that the suspicious device driver has been reported from a single network, determine that the suspicious device driver is not a malware device driver.

34. The article of claim 32, wherein causing the processor to evaluate whether the suspicious device driver is a malware device driver further comprises causing the processor to:
compare the determined quantity of devices for which the suspicious device driver has been reported against a second lower threshold;
compare the time range of the determined quantity of devices against a second upper threshold; and
determine that the suspicious device driver is a malware device driver based at least on a determination that the determined quantity of devices is less than the second lower threshold and the time range of the determined quantity of devices exceeds the second upper threshold.

35. A system for detecting malware device drivers, comprising:
- a processor;
- a computer readable medium coupled to the processor; and
- computer-executable instructions carried on the computer readable medium, the instructions readable by the processor, the instructions, when read and executed, for causing the processor to:
  - obtain information about one or more device drivers loaded on an electronic device, the one or more device drivers determined to be suspicious device drivers;
  - access information about the suspicious device drivers from a reputation system, the reputation system configured to store information about suspicious device drivers; and
  - evaluate whether the suspicious device drivers comprise malware device drivers, comprising causing the processor to:
    - compare the distribution pattern of the suspicious device driver against a known distribution pattern, the known distribution pattern indicating a safe device driver or a malware device driver;
    - compare a determined quantity of devices for which the suspicious device driver has been reported against a first upper threshold;
    - compare the time range of the determined quantity of devices against a first lower threshold; and
    - determine that the suspicious device driver is not a malware device driver based at least on a determination that the determined quantity of devices exceeds the upper threshold and the time range of the determined quantity of devices is less than the lower threshold.

36. The system of claim 35, wherein configuring the processor to evaluate whether the suspicious device driver is a malware device driver further comprises configuring the processor to:
- determine a range of networks from which the suspicious device driver has been reported; and
- based at least on a determination that the suspicious device driver has been reported from a single network, determine that the suspicious device driver is not a malware infection.

37. The system of claim 35, wherein configuring the processor to evaluate whether the suspicious device driver is a malware device driver further comprises configuring the processor to:
- compare the determined quantity of devices for which the suspicious device driver has been reported against a second lower threshold;
- compare the time range of the determined quantity of devices against a second an upper threshold; and
- determine that the suspicious device driver is a malware device driver based at least on a determination that the determined quantity of devices is less than the second lower threshold and the time range of the determined quantity of devices exceeds the second upper threshold.

* * * * *